(12) United States Patent
Feldberg

(10) Patent No.: US 6,234,286 B1
(45) Date of Patent: May 22, 2001

(54) POLE VIBRATION DAMPENER

(76) Inventor: Michael L. Feldberg, 9205 - 30th Ave. North, New Hope, MN (US) 55427

( * ) Notice: Subject to any disclaimer, the term of this patent is extended or adjusted under 35 U.S.C. 154(b) by 0 days.

(21) Appl. No.: 09/258,742

(22) Filed: Feb. 26, 1999

(51) Int. Cl.$^7$ .................................................. F16F 7/10
(52) U.S. Cl. .................................................. 188/379
(58) Field of Search ........................ 188/379, 378, 188/380, 381, 268; 267/140.11, 140.12, 140.13, 140.5; 174/42

(56) References Cited

U.S. PATENT DOCUMENTS 3,612,222 * 10/1971 Minor .................... 188/379
4,130,185 * 12/1978 Densmore ............... 188/378
4,350,233 * 9/1982 Buckley .................. 188/378

* cited by examiner

Primary Examiner—Matthew C. Graham
Assistant Examiner—Melanie Talavera
(74) Attorney, Agent, or Firm—John W Adams

(57) ABSTRACT

An assembly for dampening vibration of a hollow elongated upstanding pole which includes a cylindrical housing specifically adapted to be securely attached to the inside of the upper portion of the pole and containing a weighted member confined within the housing to move therewithin in response to vibration of the pole produced by the wind and having attachment screws extending through the side wall of the pole into threaded openings provided in an attachment rib formed on the wall of the housing.

3 Claims, 1 Drawing Sheet

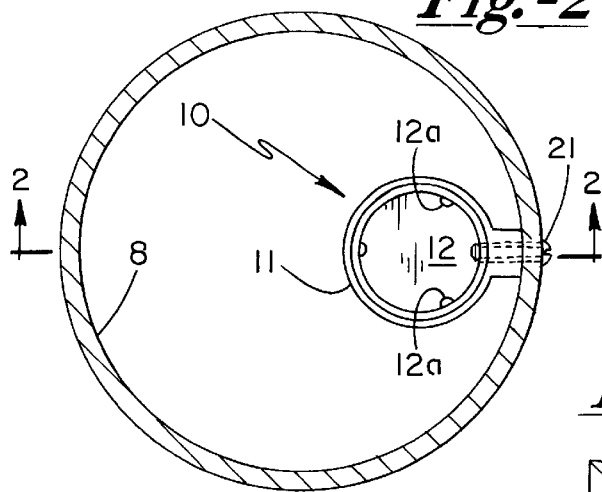
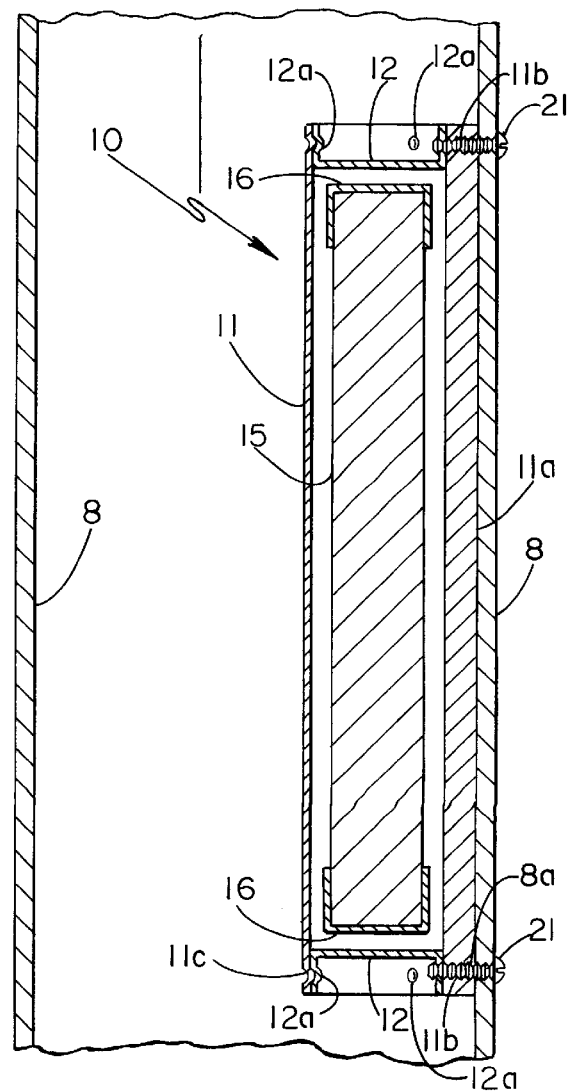

POLE VIBRATION DAMPENER

BACKGROUND OF THE INVENTION

This invention is related to a system for dampening the vibration produced by the wind in elongated light poles and the like. The pole structures can be seriously damaged by the force of the wind and dampening devices embodying this invention can prevent such vibration stresses from occurring.

U.S. Pat. No. 3,612,222 issued Oct. 12, 1971 to Ray C. Minor constitutes the most pertinent prior art familiar to applicant herein.

SUMMARY OF THE INVENTION

The appearance of an externally mounted vibration dampener detracts from outside appearance of the pole and is a serious objection with the Minor construction. The welding attachment suggested in the Minor patent is difficult to accomplish, since the dampener casing is located within the hollow tubular pole member. Applicant's structure is easily installed in the upper portion of the pole by means of attachment screws extending through the pole wall and into suitable threaded portions of the dampener casing.

DESCRIPTION OF THE DRAWINGS

FIG. 1 is a longitudinal sectional view through a portion of a hollow pole member with a dampener embodying this invention secured therewithin; and FIG. 2 is a cross sectional view of the structure shown in FIG. 1 taken along the line 2—2 of FIG. 1.

DESCRIPTION OF THE INVENTION

A portion of a hollow pole 8 is shown in FIG. 1 and a dampener assembly 10 embodying the invention is secured therewithin. The assembly as a cylindrical housing 11 and a pair of end caps 12 inserted into the ends thereof to define a chamber in which a cylindrical dampening bar or weight 15 is inserted. The dampening bar 15 is somewhat shorter than the length of the chamber and constitutes a vibration dampener which counteracts vibration of the pole member 8.

The pole 8 is provided with a pair of spaced holes 8a on the side wall thereof and a pair of anchoring screws 21 are inserted through the holes 8a in the pole and through the threaded holes in the elongated attachment bar or rib 11a provided on the outside of the housing 11. The rib has internally threaded attachment holes 11b through which the anchoring screws 21 are inserted to secure the housing 11 to the inside of the side wall of the pole 8.

The end caps 12 have dimples 12a which receive cooperating dimples 11c formed in the end portions of the housing 11 in registration therewith to combine with the screws 21 to positively anchor the end caps 12 within the ends of the housing 11 as best shown in FIG. 1.

It will be seen that this invention provides an easily installed vibration dampener for a pole assembly which effectively counteracts the vibration caused by external wind forces. The weight 15 inserted in the housing 11 is of course a solid member and plastic caps 16 are provided for effectively cushioning the weight 15 as it moves within the chamber of the dampener housing 11.

What is claimed is:

1. A vibration dampening assembly constructed for fixed attachment to the inside of a hollow light pole member, said assembly including an elongated hollow housing member defining a chamber therewithin, a dampening bar slidably mounted for movement within the chamber and being shorter in length than the chamber to permit the bar to shift longitudinally within the housing and provide a vibration dampening effect on the hollow light pole when attached thereto, said housing having an attachment rib extending longitudinally thereof and provided with means for connecting the housing to the inside wall of the hollow light pole.

2. The structure set forth in claim 1 wherein said attachment rib comprises an elongated attachment bar fixed to said housing to provide rigid means for anchoring the chamber to the wall of said pole.

3. The structure set forth in claim 2 and said housing attachment means comprising a pair of spaced threaded openings formed in the attachment rib and a pair of attachment screws adapted to extend through the side wall of the hollow light pole and attach the rib of the housing member in fixed relation within the hollow light pole to dampen vibration of the hollow light pole caused by external wind forces.

\* \* \* \* \*